Figure 1:
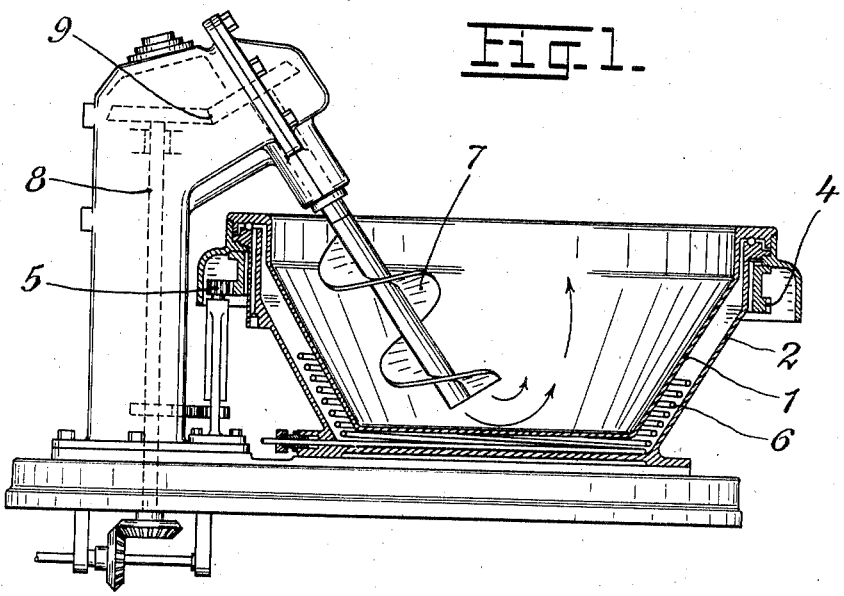

April 8, 1941.　　　　　　H. BILLE　　　　　　2,237,859
MIXING AND KNEADING MACHINE, PARTICULARLY FOR
PLASTIC EXPLOSIVES OR THE LIKE
Filed Jan. 27, 1939　　　2 Sheets-Sheet 2
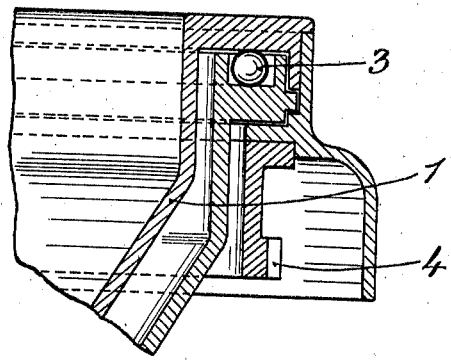
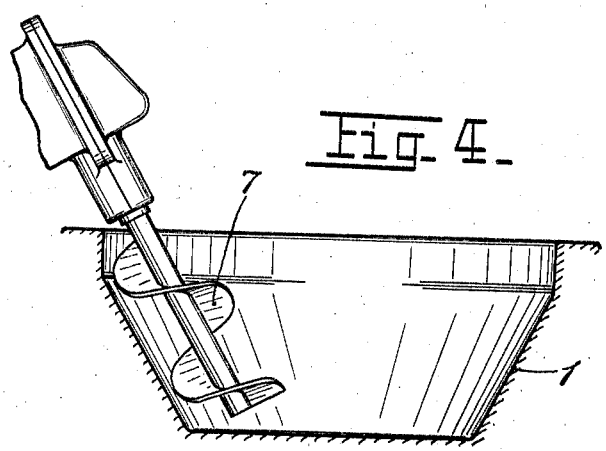
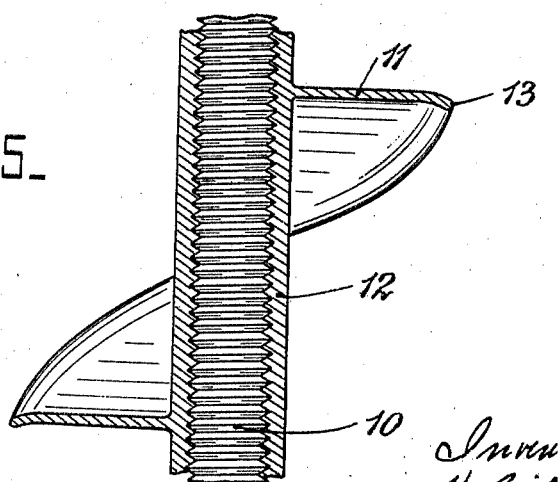

Patented Apr. 8, 1941

2,237,859

UNITED STATES PATENT OFFICE 2,237,859

MIXING AND KNEADING MACHINE, PARTICULARLY FOR PLASTIC EXPLOSIVES OR THE LIKE

Henrich Bille, Saetre i Hurum, Norway, assignor to Norsk Spraengstofindustrie A/S., Oslo, Norway Application January 27, 1939, Serial No. 253,215
In Norway February 4, 1938

1 Claim. (Cl. 259—85)

This invention relates to a mixing and kneading machine which is particularly adapted for mixing and kneading plastic explosives, but which may obviously also be used for mixing and kneading other similar masses or for the mixing of pulverized products or the like.

As regards the use of the invention for its main purpose, which is the mixing and kneading of plastic explosives, it may be noted:

Practically all explosives for civil use are composed of different ingredients which require a thorough mixing in order to obtain a finished product of sufficient homogeneity. In case one or more of these ingredients are viscous, such as gelatines of nitroglycerine and gun cotton or the like, it is of particular importance for the homogeneity of the product that simultaneously with this mixing (stirring) there takes place a kneading of the lumps which may be present in the gelatine or in the other materials, or which may be formed during the operation of mixing the several ingredients.

Experience has shown that this work of kneading is very important also for the reason that it imparts to the material a tenacious plasticity, which is considered a very important property in all plastic explosives, such as dynamite and the like.

In accordance with the present invention the mixing and kneading machine comprises a mixing trough rotating about a vertical axis and which is preferably made in the form of a truncated cone with its broadest part turned upwards. Extending downwards into said mixing trough there is provided a helical conveyer, the axis of which forms an angle with the vertical axis of the mixing trough and is located in a vertical plane displaced with relation to the said vertical axis of the rotating mixing trough. The pitch and velocity of rotation of said helical conveyer should preferably be so determined that its capacity of transport in the axial direction of the conveyer is greater than the amount of material conveyed by the rotating trough towards the helical conveyer.

The conveying work of the helical conveyer causes a pressure against the bottom and side surfaces of the trough as well as against the surrounding material. As the trough as well as the material therein moves more slowly than the material conveyed along the axis of the helical conveyer by the latter, a kneading of the material transported by the conveyer will take place partly against the bottom and side surfaces of the trough and partly as a consequence of displacements of the material contained in the trough.

Figure 2:
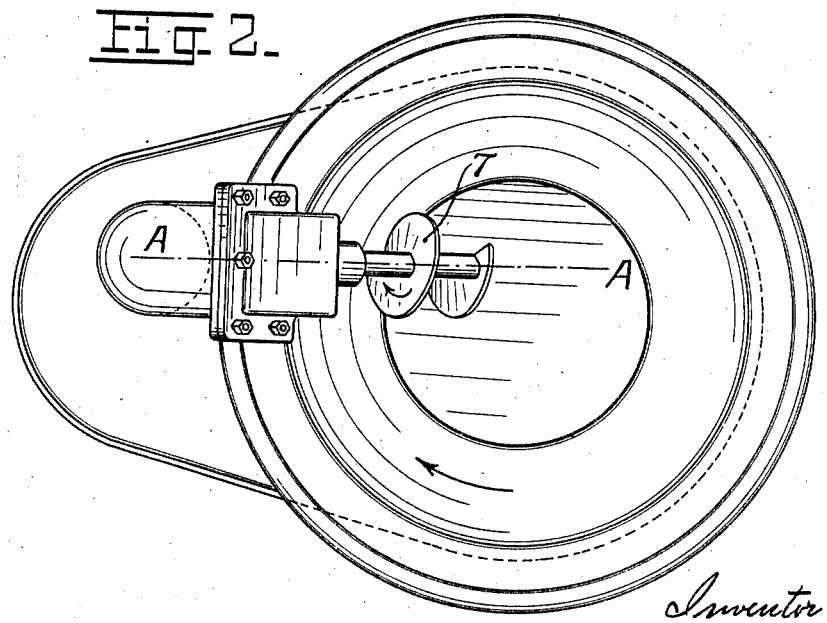

A preferred embodiment of the invention is illustrated on the accompanying drawings, where Figure 1 is a sectional side view through the mixing trough, Figure 2 is a plan view, Figure 3 is a section on a larger scale of the bearing for the rotating mixing trough, Figure 4 is a section on the line A—A on Figure 2, and Figure 5 is an axial section of part of the helical mixing conveyer on a larger scale.

I is the mixing trough, which as will be noted is provided with conical side surfaces and which is supported on the upper edge of a surrounding stationary trough 2 by means of ball bearing 3.

Outside the stationary trough 2 the mixing trough I is provided with an annular tooth rack 4 engaged by a pinion 5, by which the trough is rotated through gearing comprising, for example, a spur wheel on driving and driven shafts and one or more intermediate wheels. The space between the troughs I and 2 may preferably be filled with water or other liquid, which is maintained at a suitable temperature by means of a coil 6, through which is passed a heating (or cooling) fluid. The mixing conveyer 7 consisting of a single worm or helix is located in an inclined position along the wall of the mixing trough and is driven from shaft 8 by means of gears 9.

As it will be seen from Figure 2, the axis of the mixing conveyer 7 is located in a vertical plane which is displaced with relation to the vertical axis of rotation of mixing trough I, so that the helical mixing conveyer imparts to the material in the trough a tangential movement in the same direction as the one in which the mixing trough rotates. As the helical conveyer 7 is given a velocity of rotation and a pitch, by means of which its conveying capacity in its own axial direction exceeds the amount of material conveyed in the horizontal plane by means of the mixing trough, it will only be exposed to a negligible bending stress from the material in the trough, and the risk of fracture of the mixing conveyer is thereby considerably reduced, which is a feature of great importance in the treatment of explosive masses.

A machine in accordance with the present invention requires a minimum amount of driving energy, a fact of considerable importance for the safe operation of the machine.

Further advantages of the present machine for the treatment of plastic explosives consist in the fact that there is only a single mixing element, whereby the risk connected with the use of several or divided mixing members is avoided.

Further the present mixing and kneading machine has the advantage of having no large and heavy parts immediately above the mixing trough and that a fracture of the mixing conveyer, if such fracture should take place, will not cause any particular risk, as the part broken off in that case will just sink to the bottom of the trough and follow the movement thereof without being brought in touch with other members so as to cause disaster.

The mixing conveyer may preferably be given the form illustrated on Figure 5. In accordance with this embodiment the helical conveyer comprises a central externally threaded steel core 10 and a one-piece helical conveyer 11 of bronze or the like, having an internally threaded hollow shaft 12, adapted to engage the externally threaded steel core 10, the threads being given the opposite direction of the helical conveyer surface, so that the pressure exerted against the helical conveyer during its work will act to tighten the engagement between the hollow shaft 12 and the steel core 10.

Further the helical conveyer surface 11 may be provided with a sloping section along its exterior edge, as indicated at 13, in order to counteract the tendency to outwards radial movement of the material.

I claim:

A mixing and kneading machine, particularly for plastic explosives, comprising a mixing trough having the form of a truncated cone with its broadest end turned upwards and rotating about a vertical axis, and a single worm serving as a rotating helical mixer and conveyer and extending in a sloping position into said rotating mixing trough, the axis of said conveyer being located in a vertical plane which is displaced with relation to the axis of rotation of said trough, and the lower end of said conveyer being entirely submergible in the plastic material being mixed and kneaded.

HENRICH BILLE.